US008292477B2

(12) United States Patent
Juang et al.

(10) Patent No.: US 8,292,477 B2
(45) Date of Patent: Oct. 23, 2012

(54) HEAT DISSIPATING LAMP STRUCTURE

(75) Inventors: Jia-Yi Juang, Taipei County (TW); Yao-Sheng Liu, Taipei County (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 297 days.

(21) Appl. No.: 12/786,441

(22) Filed: May 25, 2010

(65) Prior Publication Data

US 2011/0266938 A1 Nov. 3, 2011

(30) Foreign Application Priority Data

Apr. 29, 2010 (TW) .............................. 99113707 A

(51) Int. Cl.
*B60Q 1/06* (2006.01)
*H01J 1/02* (2006.01)

(52) U.S. Cl. ................... 362/373; 362/294; 362/249.02; 313/44; 313/45; 313/46; 313/318.01

(58) Field of Classification Search .................. 362/373, 362/294, 547, 97.3, 249.02; 313/46, 318.01, 313/33, 512, 45, 498, 35, 36, 44
See application file for complete search history.

(56) References Cited

U.S. PATENT DOCUMENTS

| | | | | |
|---|---|---|---|---|
| 7,396,146 | B2 * | 7/2008 | Wang | 362/294 |
| 7,631,987 | B2 * | 12/2009 | Wei | 362/294 |
| 7,806,564 | B2 * | 10/2010 | Liang | 362/294 |
| 7,874,699 | B2 * | 1/2011 | Liang | 362/249.02 |
| 7,992,624 | B2 * | 8/2011 | Huang | 165/80.3 |
| 8,018,136 | B2 * | 9/2011 | Gingrich et al. | 313/498 |
| 8,021,019 | B2 * | 9/2011 | Chen et al. | 362/249.06 |
| 8,047,685 | B2 * | 11/2011 | Wu et al. | 362/277 |
| 8,072,130 | B2 * | 12/2011 | Wang et al. | 313/318.01 |
| 2007/0279921 | A1 * | 12/2007 | Alexander et al. | 362/368 |
| 2009/0141508 | A1 * | 6/2009 | Peng et al. | 362/373 |
| 2009/0279314 | A1 * | 11/2009 | Wu et al. | 362/373 |
| 2009/0296402 | A1 * | 12/2009 | Chang et al. | 362/294 |
| 2010/0110691 | A1 * | 5/2010 | Hsu et al. | 362/294 |
| 2010/0126697 | A1 * | 5/2010 | Huang | 165/80.3 |
| 2011/0128730 | A1 * | 6/2011 | Chiu | 362/235 |
| 2011/0128742 | A9 * | 6/2011 | Yuen et al. | 362/294 |

FOREIGN PATENT DOCUMENTS

| | | |
|---|---|---|
| TW | I263008 | 10/2006 |
| TW | M364175 | 9/2009 |

* cited by examiner

*Primary Examiner* — Nimeshkumar Patel
*Assistant Examiner* — Jose M Diaz
(74) *Attorney, Agent, or Firm* — Jianq Chyun IP Office

(57) ABSTRACT

A lamp structure includes a transparent cap, a lamp housing, a ring section, a separating pad, and a lamp board. The lamp housing has heat dissipating fins annularly arranged around the lamp housing. An end of each of the heat dissipating fins adjacent to the transparent cap has a groove, and the transparent cap covers the top of the groove. The ring section connects the end of each of the heat dissipating fins adjacent to the transparent cap. The separating pad is disposed on the bottom of the groove and extends along a sidewall of the groove to a region below the transparent cap to form a separating wall. The lamp board having light emitting diode devices is disposed in a containing space between the transparent cap and the separating pad to preclude damages caused by electrostatic discharge.

11 Claims, 2 Drawing Sheets

HEAT DISSIPATING LAMP STRUCTURE

CROSS-REFERENCE TO RELATED APPLICATION

This application claims the priority benefit of Taiwan application serial no. 99113707, filed on Apr. 29, 2010. The entirety of the above-mentioned patent application is hereby incorporated by reference herein and made a part of specification.

BACKGROUND OF THE INVENTION

1. Field of the Invention

The invention relates to a lamp structure. More particularly, the invention relates to a lamp structure having a light emitting diode (LED).

2. Description of Related Art

Costs of LEDs characterized by low power consumption, durability, and compactness are reduced together with development of manufacturing processes of the LEDs, and therefore products applying the LEDs as light sources are more and more common.

At present, the main issue of applying the LEDs as illumination lamps rests in heat dissipation. Inefficient heat dissipation leads to an increase in temperature of the lamps, which shortens the life span of the LEDs. The remaining heat also results in reduction of efficiency of fluorescence powder in a transparent cap of the lamp, such that color of emitting light is changed, and that color quality is negatively affected. The overall lifetime of the lamp is also shortened due to the excessively high temperature. On the other hand, normal illumination lamps using the LEDs are vulnerable to electrostatic discharge (ESD) and high pressure, and damages caused by the ESD and the high pressure to the illumination lamps significantly reduce the lifetime of the LED lamps.

SUMMARY OF THE INVENTION

The invention is directed to a lamp structure capable of dissipating heat to a better extent and preventing damages caused by ESD and high pressure.

In the invention, a lamp structure including a transparent cap, a lamp housing, a ring section, a separating pad, and a lamp board is provided. The lamp housing has a plurality of heat dissipating fins annularly arranged around the lamp housing. One end of each of the heat dissipating fins adjacent to the transparent cap has a groove, and the transparent cap covers the top of the groove. The ring section connects the end of each of the heat dissipating fins adjacent to the transparent cap. The separating pad is disposed on the bottom of the groove and extends along a sidewall of the groove to a region below the transparent cap to form a separating wall. The lamp board has a plurality of LED devices and is disposed in a containing space between the transparent cap and the separating pad to preclude damages caused by ESD.

According to an embodiment of the invention, the lamp structure further includes a spiral portion connecting one end of the lamp housing away from the transparent cap. An outer diameter of the heat dissipating fins decreases along a direction from the transparent cap to the spiral portion.

According to an embodiment of the invention, each of the heat dissipating fins has a first curved surface and a second curved surface. A bending portion is formed at a junction of the first curved surface and the second curved surface. The first curved surface connects the ring section, and the second curved surface extends along a direction toward the spiral portion.

According to an embodiment of the invention, the spiral portion has an external thread and a conductor located at an end of the spiral portion away from the lamp housing. The external thread is electrically insulated from the conductor.

According to an embodiment of the invention, the lamp structure further includes a driver and two conductive wires disposed within the lamp housing. One end of the driver is electrically connected to the conductor through one of the two conductive wires, and the other end of the driver is electrically connected to the lamp board through the other one of the two conductive wires passing through the bottom of the groove and the separating pad.

According to an embodiment of the invention, the separating pad has at least one through hole, and one of the conductive wires penetrating the at least one through hole is electrically insulated from the separating pad.

According to an embodiment of the invention, an insulating adhesive is formed around an inner wall of the at least one through hole.

According to an embodiment of the invention, the separating pad and the separating wall are insulators conducting heat but not electricity, and a material of the separating pad and the separating wall is selected from one of ceramics, plastic, rubber, and glass.

According to an embodiment of the invention, the heat dissipating fins radially arranged have a sheet shape.

According to an embodiment of the invention, the separating pad and the separating wall together form a hollow container.

Based on the above, the separating pad and the separating wall capable of protecting the lamp board and the LED from being damaged by the ESD are employed in the invention, so as to prolong the life span of the lamp. In addition, the separating pad is an insulating layer conducting heat but not electricity. Thereby, heat generated by the lamp board and the LED can be transmitted to the heat dissipating fins located around the lamp housing, such that heat dissipation efficiency of the lamp is improved.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
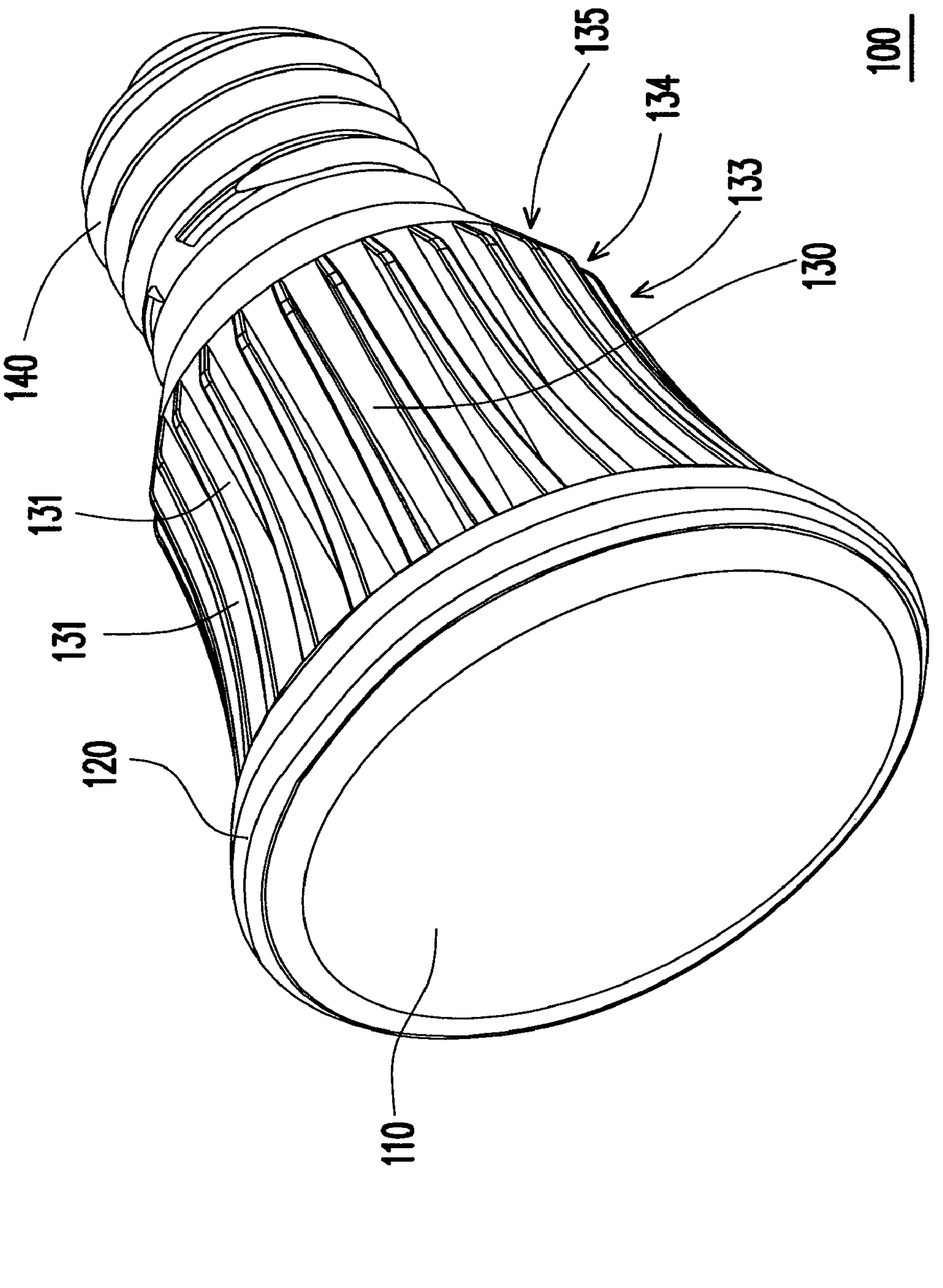
FIG. 1 is a perspective view illustrating a lamp structure according to an embodiment of the invention.
Figure 2:
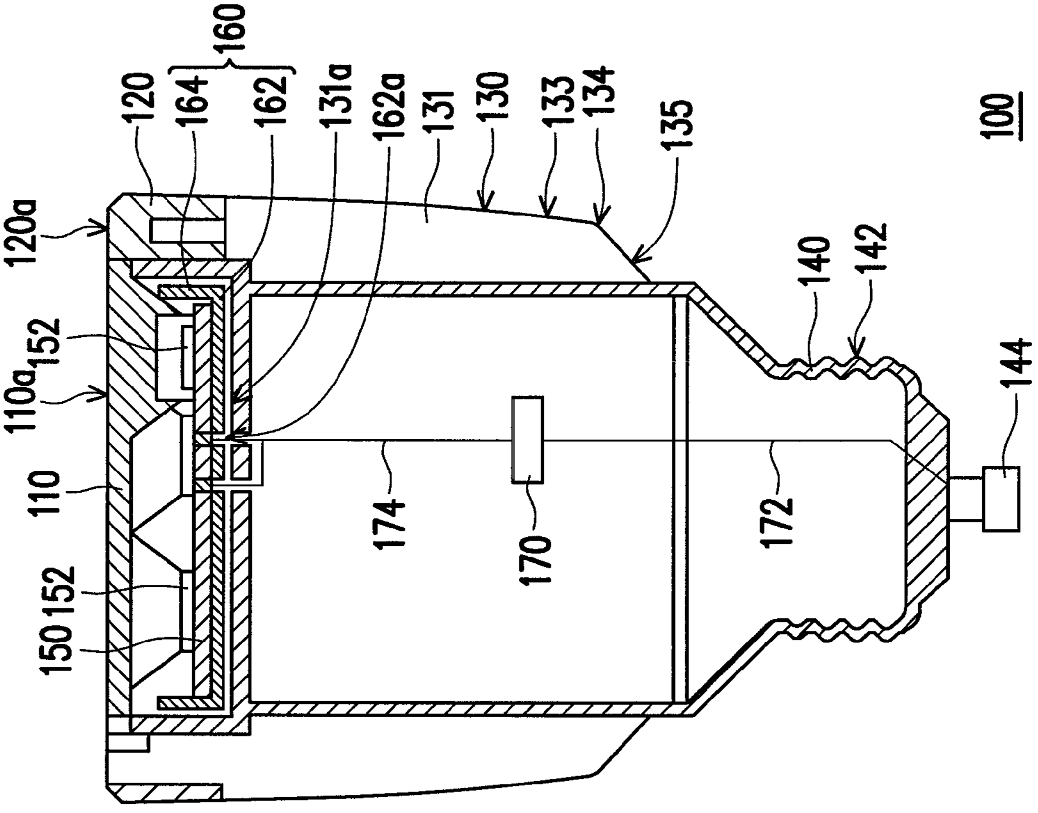
FIG. 2 is a cross-sectional view illustrating the lamp structure depicted in FIG. 1.

FIG. 1 is a perspective view illustrating a lamp structure according to an embodiment of the invention. FIG. 2 is a cross-sectional view illustrating the lamp structure depicted in FIG. 1.

As indicated in FIG. 1 and FIG. 2, a lamp structure 100 includes a transparent cap 110, a ring section 120 surrounding the peripheries of the transparent cap 110, a lamp housing 130, and a spiral portion 140. A lamp board 150 has a plurality of LED devices 152 and is disposed in a containing space between the transparent cap 110 and a separating pad 162 to preclude damages caused by electrostatic discharge. The transparent cap 110 is disposed on a top of the lamp housing 130. An outer surface 110*a* of the transparent cap 110 is substantially aligned to an upper surface 120*a* of the ring section 120, while the transparent cap 110 can also protrude outward to form a cup-shaped transparent cap, which should not be construed as a limitation to this invention. The spiral portion 140 is connected to the bottom of the lamp housing 130. The lamp housing 130 has a plurality of heat dissipating fins 131 arranged around the lamp housing 130. An outer diameter formed by the ends of the heat dissipating fins 131 adjacent to the transparent cap 110 is greater than an outer diameter of the transparent cap 110, and the end of each of the heat dissipating fins 131 adjacent to the transparent cap 110 is connected to the ring section 120. The ring section 120 is located above the lamp housing 130 and covers the peripheries of the transparent cap 110. An inner diameter of the ring section 120 is approximately equal to the outer diameter of the transparent cap 110, and an outer diameter of the ring section 120 is approximately equal to the outer diameter of the heat dissipating fins 131 adjacent to the transparent cap 110. In other words, the transparent cap 110, the ring section 120, the lamp housing 130, and the spiral portion 140 can be assembled together to form the casing of the lamp.

In addition, the heat dissipating fins 131 having a sheet shape are annularly arranged around the lamp housing 130. A groove 131*a* is correspondingly located below the transparent cap 110 and located at a central portion of each of the heat dissipating fins 131. A dimension of the groove 131*a* is slightly smaller than a dimension of the transparent cap 110. Therefore, the transparent cap 110 can cover the top of the groove 131*a* and lean against the peripheries of the groove 131*a*, and a sealed space is formed by sealing the transparent cap 110 and the groove 131*a* with use of a sealing adhesive (not shown). The separating pad 162 is disposed on the bottom of the groove 131*a* and extends along a sidewall of the groove 131*a* to a region below the transparent cap 110 to form a separating wall 164. As shown in the cross-sectional view of FIG. 2, the separating pad 162 and the separating wall 164 can together form a hollow container 160, and a height of the separating wall 164 is greater than the entire thickness of the lamp board 150 and the LED 152. Hence, when the lamp board 150 and the LED 152 are disposed in the sealed space, a bottom surface and a side surface of the lamp board 150 and those of the LED 152 are protected by the separating pad 162 and the separating wall 164, such that the lamp board 150 and the LED 152 can be electrically isolated from charges accumulated on the lamp housing 130, and that damages caused by ESD can be prevented. Moreover, the lamp structure 100 is invulnerable to high pressure because of properties of the material of the hollow container 160 and an increased insulation distance among the lamp board 150 and an extending part of the spiral portion 140 that extending into the lamp housing 130 and carrying the separating pad 162.

In this embodiment, the separating pad 162 and the separating wall 164 are insulators conducting heat but not electricity, and a material of the separating pad 162 and the separating wall 164 can be ceramics or any other equivalent material, such as plastic, rubber, or glass. At least one through hole 162*a* can be formed in advance in the separating pad 162, such as laser drilling, so that an input end of a circuit in the lamp board 150 can be connected to other circuit devices through the through hole 162*a*.

On the other hand, each of the heat dissipating fins 131 has a first curved surface 133 and a second curved surface 135, and a bending portion 134 is formed at a junction between the first curved surface 133 and the second curved surface 135. The first curved surface 133 is designed to have a radian similar to that of the outer diameter of the ring section 120, and the ring section 120 and the first curved surface 130 having the similar tile angle together extend to the bending portion 134 in a downward manner. The second curved surface 135 below the bending portion 134 is designed to have a radian similar to the spiral portion 140, and the spiral portion 140 and the second curved surface 135 have the similar tilt angle. Hence, the outer diameter of the heat dissipating fins 131 decreases along a direction from the transparent cap 110 to the spiral portion 140, and the outer diameter of the heat dissipating fins 131 is divided into two segments. The upper segment is formed by the first curved surface 133, while the lower segment is formed by the second curved surface 135.

A plurality of heat dissipating through holes (not shown) are disposed between the ring section 120 and the adjacent heat dissipating fins 131, and the grooves of the adjacent the heat dissipating fins 131 communicate with the heat dissipating through holes. Hot air generated around the transparent cap 110 can be dissipated because of air convection between the heat dissipating through holes and the heat dissipating fins 131. As indicated in FIG. 1, the outer diameter of the heat dissipating fins 131 adjacent to the transparent cap 110 is greater than the outer diameter of the transparent cap 110, and the outer diameter of the ring section 120 is greater than the outer diameter formed by the heat dissipating fins 131. Thereby, air can be better convected through the heat dissipating through holes, and the heat dissipation efficiency can be improved.

Besides, the spiral portion 140 has an external thread 142. When the lamp is connected to a power connector (not shown), the external thread 142 is screwed with an internal thread of the power connector and fixed to the power connector. A conductor 144 located at the bottom of the spiral portion 140 is separated from and not conducted to the external thread 142. Therefore, the external thread 142 is electrically insulated from the conductor 144. Moreover, a driver 170 is disposed within the lamp housing 130. The driver 170, for example, is a package of a circuit board and a control chip. One end of the driver 170 can be electrically connected to the conductor 144 located at the bottom of the spiral portion 140 through a conductive wire 172, and the other end of the driver 170 can be electrically connected to the lamp board 150 through a conductive wire 174 passing through the bottom of the groove 131*a* and the through hole 162*a* of the separating pad 162. An insulating adhesive (not shown) can be formed around an inner wall of the through hole 162*a*. The insulating adhesive is a hollow adhesive capable of electrically insulating the separating pad 162 from the conductive wire 174 passing through the through hole 162*a*, such that the conductive wire 174 and the separating pad 162 are not electrically conducted.

In light of the foregoing, the separating pad capable of protecting the lamp board and the LED from being damaged by the ESD is employed in the invention, so as to lengthen the life span of the lamp. Moreover, the separating pad is an insulating layer conducting heat but not electricity. Thereby, heat generated by the lamp board and the LED can be transmitted to the heat dissipating fins located around the lamp housing, such that heat dissipation efficiency of the lamp is improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A lamp structure comprising:

a transparent cap;

a lamp housing having a plurality of heat dissipating fins annularly arranged around the lamp housing, one end of each of the heat dissipating fins adjacent to the transparent cap having a groove, the transparent cap covering a top of the groove;

a ring section connecting the end of each of the heat dissipating fins adjacent to the transparent cap;

a separating pad disposed on a bottom of the groove and extending along a sidewall of the groove to a region below the transparent cap, such that a separating wall is formed; and a lamp board having a plurality of light emitting diode devices and disposed in a containing space between the transparent cap and the separating pad to preclude damages caused by electrostatic discharge, wherein the separating pad is positioned between the lamp board and the bottom of the lamp housing by the transparent cap contacting the light emitting diode devices.

2. The lamp structure as claimed in claim 1, further comprising a spiral portion connecting one end of the lamp housing away from the transparent cap, an outer diameter of the heat dissipating fins decreasing along a direction from the transparent cap to the spiral portion.

3. The lamp structure as claimed in claim 2, each of the heat dissipating fins having a first curved surface and a second curved surface, a bending portion being formed at a junction between the first curved surface and the second curved surface, wherein the first curved surface connects the ring section, and the second curved surface extends along a direction toward the spiral portion.

4. The lamp structure as claimed in claim 2, wherein the spiral portion has an external thread and a conductor located at one end of the spiral portion away from the lamp housing, and the external thread is electrically insulated from the conductor.

5. The lamp structure as claimed in claim 4, further comprising a driver and two conductive wires disposed within the lamp housing, one end of the driver being electrically connected to the conductor through one of the two conductive wires, the other end of the driver being electrically connected to the lamp board through the other one of the two conductive wires passing through the bottom of the groove and the separating pad.

6. The lamp structure as claimed in claim 5, wherein the separating pad has at least one through hole, and one of the conductive wires penetrating the at least one through hole is electrically insulated from the separating pad.

7. The lamp structure as claimed in claim 6, wherein an insulating adhesive is formed around an inner wall of the at least one through hole.

8. The lamp structure as claimed in claim 1, wherein the separating pad and the separating wall are insulators conducting heat but not electricity, and a material of the separating pad and the separating wall is selected from one of ceramics, plastic, rubber, and glass.

9. The lamp structure as claimed in claim 1, wherein the heat dissipating fins radially arranged have a sheet shape.

10. The lamp structure as claimed in claim 1, wherein the separating pad and the separating wall together form a hollow container.

11. The lamp structure as claimed in claim 6, wherein the separating pad and the separating wall are insulators conducting heat but not electricity, and a material of the separating pad and the separating wall is selected from one of ceramics, plastic, rubber, and glass.

* * * * *